United States Patent

[11] 3,605,003

| [72] | Inventor | Walter B. Guggi<br>CH-8172 Niederglatt, Switzerland |
|---|---|---|
| [21] | Appl. No. | 24,007 |
| [22] | Filed | Mar. 30, 1970 |
| [45] | Patented | Sept. 14, 1971 |
| [32] | Priority | Mar. 26, 1969 |
| [33] | | Switzerland |
| [31] | | 4893/69 |

[54] STABILIZED SINE WAVE INVERTER
6 Claims, 3 Drawing Figs.

[52] U.S. Cl. ................................................. 321/45, 321/18, 321/24
[51] Int. Cl. ....................................................... H02m 7/48
[50] Field of Search .......................................... 321/18, 21, 24, 44, 45

[56] References Cited
UNITED STATES PATENTS
3,416,063  12/1968  Guggi ........................... 321/18

| 3,413,539 | 11/1968 | Lopitzsch | 321/45 |
| 3,366,866 | 1/1968 | King | 321/18 X |
| 3,358,210 | 12/1967 | Grossoehme | 321/18 |

FOREIGN PATENTS

| 1,098,459 | 1/1968 | Great Britain | 321/18 |

Primary Examiner—J. D. Miller
Assistant Examiner—John M. Gunther
Attorney—McGlew and Tuttle ABSTRACT: Direct current is converted into alternating current by rendering switches such as SCR's alternatively conductive and thereby providing an alternating current flow within an arrangement of inductors and capacitors. Some of the alternating current is rectified and fed back through appropriate networks to the DC current input side of the inverter thereby stabilizing the output voltage and preserving the wave shape generated by the inverter as the load changes.

STABILIZED SINE WAVE INVERTER

This invention relates to stabilized inverters and more particularly to inverters including trigger controlled current valves, furthermore, including tuned LC circuits for producing alternating current outputs and particularly stabilized sine wave or sinelike outputs, where by energy derived from a direct current source is fed through a DC path comprising a swinging inductor and chopping means alternately contacting opposite polarity terminals of a transformer winding, said winding being bridged by a capacitor thereby permitting the drain of energy from said transformer in the form of alternating current, furthermore including energy feedback means leading from the AC output side back to the DC side of the inverter.

Known sine wave inverters based on controlled current valves such as thyratrons and ignitrons in connection with tuned LC circuits generating sine wave outputs can be built for very high power levels and are in practical use for instance for energy exchange between DC and AC power grids as well as for motor control and other purposes.

All these inverters have at least one serious disadvantage which includes considerable voltage variation as a function of load change caused by energy storage within the reactive components which are part of the tuned circuit arrangements. As a consequence such inverters must operate in connection with complicated regulating schemes to be able to accommodate load changes or they must be connected to a stabilized AC grid. It was mentioned before that in order to generate sine waves or sinelike output waveforms tuned circuit arrangements are necessary which however cause voltage variations as a function of load changes and which can reach destructive values, particularly in cases of sudden load changes which is a natural phenomena caused by energy storage within inductors or capacitors being part of such tuned circuits so that components of the inverter or the load can be damaged and therefore require complicated protecting means.

With improved SCR technology square wave inverters have become increasingly useful particularly because this technique permits output voltage stabilization with relatively simple circuitry. Stabilization by means of energy feedback can be achieved without difficulties as such feedback circuitry does not cause curve shape distortion. This permits the use of such apparatus within a wide variety of load conditions.

For practical applications it is often desirable to have a sine wave or sinelike output voltage available. This means the addition of filter networks which are costly, as well as resulting in weight and volume increases. The square wave inverter has additional serious drawbacks including extended performance requirements for SCR's, transformers capacitors and most other components used within the inverter. In addition the inverter efficiency is decreased, the upper frequency performance is limited, load-matching conditions are hard to meet, particularly in case of inductive loads (motors, etc.). In addition electromagnetic interference radiation is higher. The disadvantages are common to transistor inverter circuits as well. In addition transformers and inductors tend to generate noises at elevated frequencies which are particularly disturbing with high harmonic content as is the case with non sinusoidal wave forms.

It has been proposed to build stabilized sine wave inverters by simple feedback means whereby such systems have disadvantages mainly caused by relatively slow feedback action which can cause serious disturbances in case of sudden load changes.

It is an object of this invention to provide an improved inverter apparatus having an output voltage of sine wave or sinelike waveshape which is stable under all operating conditions, and load conditions as well as sudden load changes having optimum efficiency and operating without disturbances particularly under extremely high peak loads such apparatus comprising an extremely fast internal feedback regulating system.

It is an object of this invention to provide a scheme of energy feedback resulting in a stabilized inverter system in which a multiple DC feedback path comprising rectifiers and including at least 2 electrically separated circuits which are magnetically coupled with each other leading from a transformer winding back to the DC input side.

The novel features of this invention, its organization and method of operation and additional objects and advantages thereof will be better understood from the following description in conjunction with the accompanying drawings including three embodiments of the stabilized inverter in which.

Figure 1:
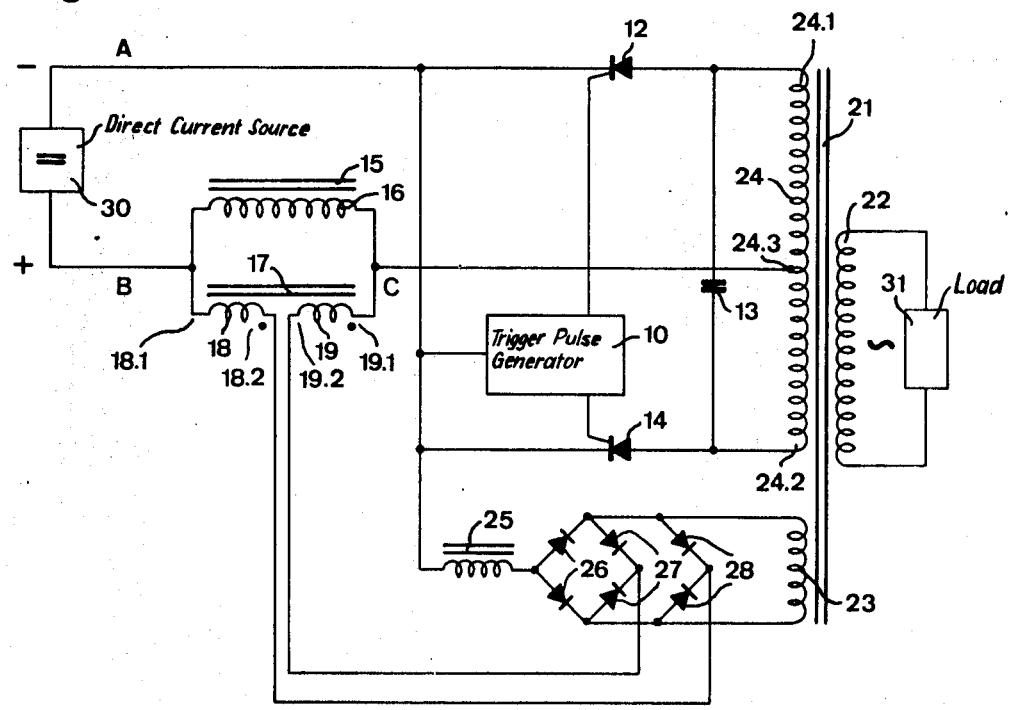
FIG. 1 shows a circuit diagram of an inverter with energy feedback from a separate transformer winding.

Referring first to FIG. 1 a direct current source 30 includes positive and negative poles. The negative pole is connected to the cathodes of SCR's 12 and 14. Their respective anodes are connected to the outer terminals 24.1 resp. 24.2 of the primary winding 24 of transformer 21 including a total of 3 windings 22, 23, 24. Connections 24.1, 24.2 are leading at the same time to the terminals of a commutation capacitor 13. A center tap 24.3 of winding 24 is connected to winding 16 of a swinging inductor 15 leading to the positive pole of the direct current source 30. In addition the center tap 24.3 is connected to one terminal 19.1 of the differential transformer 17 including windings 18 and 19. The terminal 18.1 of this transformer is connected with the positive pole of the direct current source 30.

The terminals of winding 23 of transformer 21 are connected to the anodes of two pairs of rectifiers 27, 28 the cathodes of which are connected with the inner terminals 18.2, 19.2 of both windings 18, 19 of the differential transformer 17. The terminals of winding 23 of transformer 21 in addition are connected to the cathodes of a pair of rectifiers 26 the anodes of which are connected to one terminal of inductor 25 of which the opposite terminal is connected to a direct current source 30. A trigger circuit which may be of known design is connected with one output terminal to the cathodes of SCR's 12 and 14 and with its second output terminal to their trigger electrodes. A load 31 is connected to the terminals of winding 22 of transformer 21.

The inverter circuit as described above operates as follows: DC current derived from direct current source 30 is periodically interrupted and commutated between terminals 24.1 and 24.2 with respect to the center tap 24.3 of winding 24 of transformer 21. This is achieved by conventional means including a commutating capacitor 13 together with SCR's 12 and 14 which are rendered conductive alternately through periodically applied alternate trigger pulses. Winding 22 of transformer 21 provides current flow to load 21. By resonance effect between inductor 15 and commutating capacitor 13 the current flow through either half of winding 24 generates a sine wave or sinelike output voltage across the load 31 which is connected to winding 22 of transformer 21. The periodic switching operation between SCR's 12 and 14 with respect to the center tap 24.3 of winding 24 of transformer 21 generates a virtual value of capacitance of 4 times the actual value of capacitor 13 when seen at the center tap 24.3 of winding 24 of transformer 21 which value has to be in or near resonance with the swinging inductor 15.

According to physical laws the voltage generated within such an LC circuit which is energized by periodical voltage reversal as caused by the switching action of SCR's 12 and 14 in conjunction with direct current source 30 will vary considerably as a function of circuit losses and can reach a ratio of 10:1 or higher depending on the value of load 21, requiring special means for stabilizing such a circuit for practical use.

The feedback regulating system described therein permits to equalize such voltage variations at an extremely fast rate (e.g. within ½ period of the trigger frequency) without the necessity of providing additional dissipating means for stored energy within the system. The regulating action takes place by feeding back energy from winging 23 of the output transformer 21 by rectification through rectifying pair 26 and inductor 25 leading to the negative pole of direct current source 30 respectively to diode pair 27, 28 dividing this feedback path into 2 sections leading through windings 18, 19 of the differential transformer 17 to the positive pole of the direct current source 30 as well as to the center tap 24.3 of winding 24 of transformer 21.

This feedback regulating scheme provides energy feedback with simultaneous distribution of current flow to at least two different and electrically separated points which provide nearly ideal regulating conditions. It is evident that such energy feedback can be achieved without a separate winding 23 of transformer 21. It can be connected directly to appropriate taps of the primary winding 124 of transformer 121 and the current distribution can be achieved by means of a differential inductor 117 in place of the differential transformer 17 which is indicated by the embodiment which is shown in FIG. 2.

Figure 2:
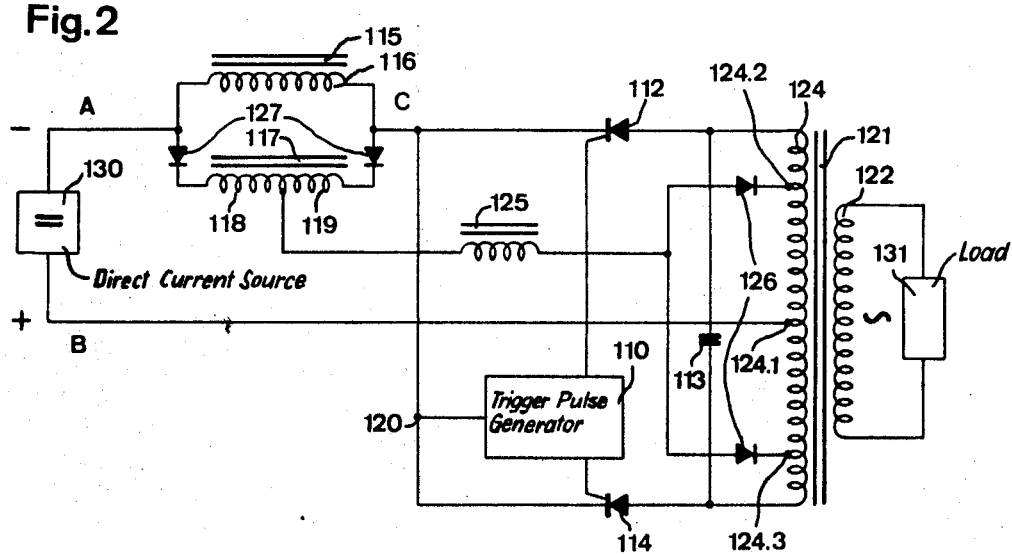
FIG. 2 shows a diagram of an inverter with energy feedback through a differential inductor and FIG. 3 shows a diagram of an inverter according to FIG. 1 with additional compensating means.

Referring to FIG. 2 a direct current source 130 includes positive and negative poles. The negative pole is connected to winding 116 of a swinging inductor 115 to the cathodes of SCR's 112, 114 their respective anodes being connected to the outer terminals of the primary winding 124 of transformer 121 comprising windings 124 and 122, furthermore the outer connections of winding 124 are connected to the terminals of a commutating capacitor 113. The positive pole of the direct current source is connected directly to the center tap 124.1 of the primary winding 124. A trigger circuit is provided the output terminals of which are connected to the cathodes respectively the trigger electrodes of SCR's 112, 114, the load 131 is connected to the secondary winding 122 of transformer 121.

Energy feedback takes place by means of two rectifiers 126 the cathodes of which are connected to appropriate taps 124.2, 124.3 of winding 124 of transformer 121. An inductor 125 and a differential inductor 117 comprising windings 118, 119 are included. Inductor 125 is connected with the anodes of rectifier pair 126 and with its second terminal to the center tap located between winding sections 118 and 119 of differential choke 117. The outer ends of winding sections 118, 119 of differential inductor 117 are connected to the cathodes of rectifiers 127, the anodes of rectifiers 127 are connected to the terminals of swinging inductor 115.

Referring to the embodiments shown in FIG. 1 and 2 the regulating system consists essentially of rectifier arrangements 26, 27, 28 resp. 126, 127. Furthermore, an inductor 25 resp. 125 and a differential transformer 17 resp. differential inductor 117. This arrangement has the purpose of clamping the output voltage across transformer windings of transformer 122 to the direct current source 30 resp. 130 and to keep output voltage variations essentially proportional to the DC supply voltage, virtually independent of load changes caused by load 31 resp. 131. As a consequence it is essential that surplus energy within the system caused by load decrease can be fed back to the DC input side in case of load decrease resp. That such return flow of energy can be cancelled immediately upon load increase whereby it is essential that such energy flow be smooth and without delay over the time period of a complete cycle.

In principle it would be possible to stabilize such an inverter by feeding back energy either between points A-B or A-C. It must be assumed however that inductor 25 resp. 125 as compared to swinging inductor 15 resp. 115 has considerably lower inductance so that periodically generated current pulses arriving from rectifier 26, 27, 28 resp. 126, 127, are being equalized without cutting off the top portion of the rectified sine wave. Both methods of energy feedback either to points A-B or A-C have certain advantages or disadvantages so that either feedback method would not represent a good solution. Current feedback to point B permits full stabilization of the system, however, it is dynamically slow while causing a minimum of curve shape distortion and requires relatively high values of steady state feedback current for acceptable stability. However in case of fast dynamic changes such as sudden disconnection of load 31 voltage surges can be generated due to energy storage within swinging inductor 15 resp. 115 or within commutating capacitor 13 resp. 113. This could cause destruction of the inverter system As the swinging inductor 15 resp. 115 has a relatively high impedance the process of energy exchange is relatively slow in case of such disturbances as it is not only necessary to cancel any energy flow from the direct current source 30 resp. 130 into the inverter but stored energy must be circulated freely within the system until all such energy has been dissipated. This however is only possible with energy feedback upon point C in order to cancel the delaying effect of the swinging inductor 15 resp. 115 being within the path of the feedback system for dynamic considerations. However since there exists on oscillation process between commutating capacitor 13 resp. 113 and inductor 15 resp. 115 point C has a potential of alternating current of double the inverter frequency. The pulses would be superimposed upon the feedback current of the stabilizing system causing considerable distortion upon the sine wave or sinelike output voltage.

The object of this invention is to include points B as well as C jointly within the feedback network in such a way as to eliminate any detrimental effects upon the output waveform, and at the same time taking advantage of the full equalizing capabilities characteristic to both connections. This can be achieved by means of multiple section feedback paths such as for instance shown in FIG. 1 where two sections are leading to a differential transformer 17 with relatively small impedance and being connected to opposite polarity terminals of winding 18 and 19 avoiding short circuiting points B and C by means of rectifier pairs 27 and 28. Another method is shown in FIG. 2 which includes a differential inductor 117 whereby the feedback paths are leading through winding sections 118, 119 and rectifiers 127 which however indicates only two examples of a number of other possible combinations resulting in similar electrical characteristics. This circuit arrangement makes it possible to eliminate the superimposition of voltage peaks which occur periodically between points B and C upon the feedback current and to eliminate their detrimental effects upon the output waveshape while maintaining even and smooth feedback current flow by the influence of the equalizing action of the differential transformer 17 resp. differential inductor 117 which at the same time permits the unobstructed circulation of surplus stored energy between inverter output and its DC input side.

The very fast equalizing action of this system for instance permits loads to be connected which include SCR's with phase angle conduction control and output current regulation such as are normally used for applications upon regular AC power lines which however are not usual for applications to inverters of conventional construction. Depending on the circuit arrangement of such an SCR control system the output current can be taken either in form of AC or DC current as is known from conventional power control techniques.

It is an essential advantage of this inverter principle that it is suitable for feeding back rectified and controlled DC current for instance by means of SCR's in series with the direct current source upon which it is being added and which may serve to equalize for instance voltage changes of such direct current source. This method also permits to equalize voltage drops caused by losses within the inverter and its components and may serve for automatic regulation of the output value. This automatic regulation can be in function of a reference voltage being compared with the output voltage or current which controls the SCR's firing angle accordingly. Such an embodiment is shown in FIG. 3 which is based upon the principle described in FIG. 1 whereby however it must be pointed out that other practical combinations can be arranged in order to achieve the same purpose.

Figure 3:
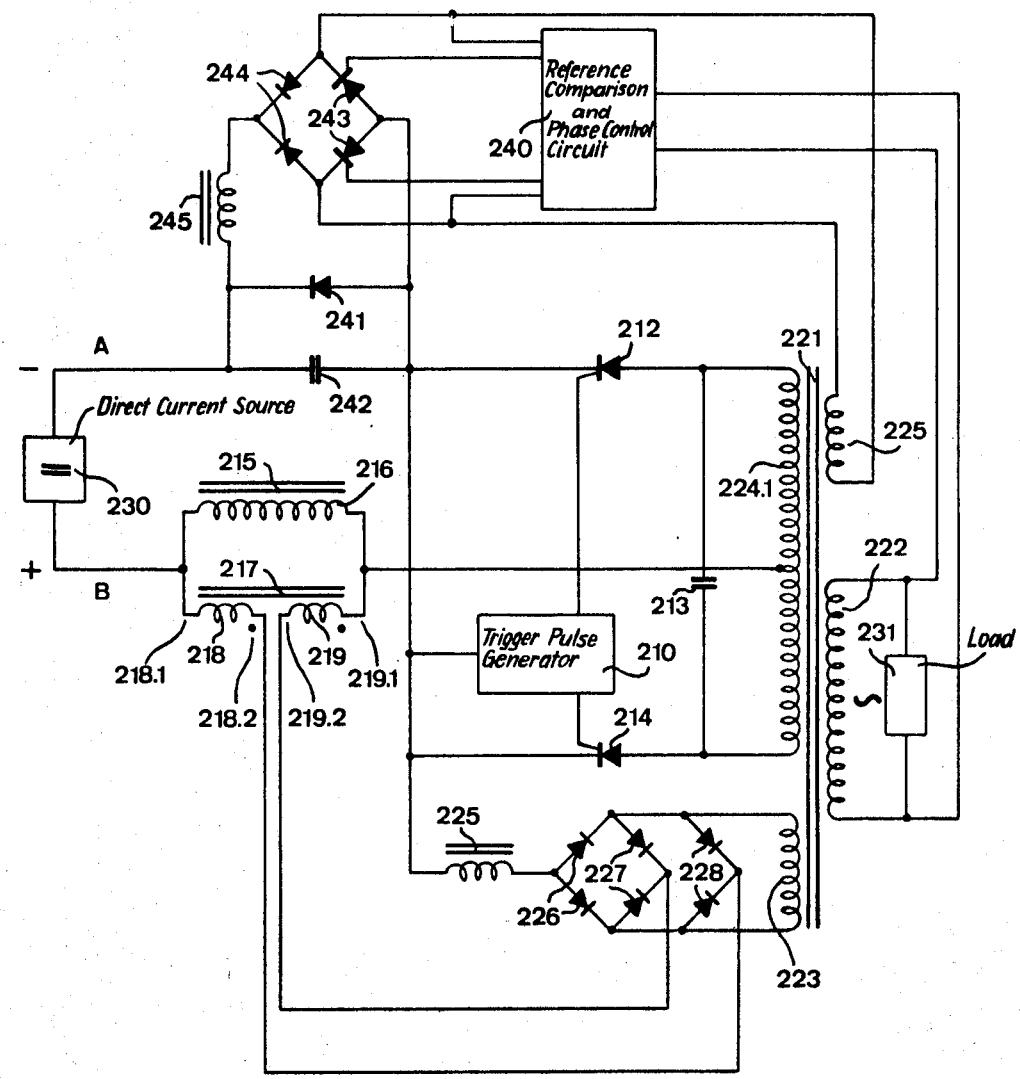

Referring to FIG. 3 the direct current source 230 with positive and negative poles is connected by its negative pole through rectifier 241 to capacitor 242 to the cathodes of SCR's 212 the anodes of which are connected to an outer terminal each of primary winding 224 of transformer 221 respectively to each terminal of commutating capacitor 213. The center tap 224.1 of winding 224 is connected through winding 216 of a swinging inductor 225 to the positive pole of the direct current source 230. This center tap is also connected to one terminal 219.1 of a winding 218, of the differential transformer 217 comprising an additional winding 219. The opposite terminal 218.1 of the transformer 217 is connected to the positive pole of the direct current source 230.

The terminals of winding 223 of transformer 221 are connected to the anodes of two rectifier pairs 227, 228 the cathodes of which are connected to the inner terminals 218.2, 219.2 of windings 218, 219 of the differential transformer 217. The outer terminals of winding 223 of transformer 221 are furthermore connected to the cathodes of a rectifier pair 226 of which the anodes are connected through inductor 225 to the negative pole of the direct current source 230. A trigger circuit 210 which may be of known design having two output terminals is connected to one end to the cathodes of SCR's 212 and 214 which other ends are connected to their respective gate electrodes. Winding 222 of transformer 221 is connected to a load 231.

An additional winding 225 of transformer 221 is connected to the anodes of diode pairs 244 as well as to the cathodes of an SCR pair 243 as well as to a terminal of a phase control system 240 having output terminals leading to gate electrodes of SCR pair 243. Furthermore, phase control system 240 has input terminals which are connected to the winding 222 of transformer 231. The cathodes of diode pairs 244 lead through inductor 245 to the negative pole of the direct current source 230. The anodes of SCR pair 243 are connected to the cathodes of SCR's 212, 214.

This circuit arrangement makes it possible to vary the output voltage of the inverter or to stabilize this output voltage without essentially affecting its curve shape. It is furthermore possible and often desirable such as for instance in a DC/DC inverter system to maintain the output wave shape of the inverter in order to avoid superimposed AC components within the DC output system while providing output regulation, this in order to reduce the necessary filter circuits to a minimum for maintaining low ripple DC output current. This represents a number of advantages as compared to direct phase angle control feeding a rectifier system for stabilizing purposes or regulating purposes in which case short current pulses will require extensive filtering to avoid high ripple content. This is important for inverter systems with sine wave output as well as such with rectangular or trapezoidal output wave shape.

The embodiments shown in FIG. 1 and FIG. 2 are to be considered examples only serving as a functional description as a person familiar with the art could easily see that variations and other combinations of regulating members used in the invention could lead to other circuit combinations while maintaining the spirit of the invention. It is also possible to apply the ideas described therein to other types of inverters without changing their essential functions so for instance to bridge-type inverters. The regulating system embodied in this invention is suitable for stabilizing inverters of sine wave, sinelike or other curve shapes. It must be mentioned particularly that for instance by eliminating inductor 25 this inverter becomes a square wave inverter.

These circuits which show an energy feedback system through windings 18, 19 resp. 118, 119 upon points B and C could as well lead to appropriate points on winding 16 resp. 116 or the swinging inductor 17 resp. 117. It is of course possible to build by combination of such inverters a multiphase system based on the same principle.

WHAT Is claimed is:

1. A stabilized DC-to-AC inverter apparatus capable of transforming DC current into AC current and particularly sinelike AC current, by means of trigger controlled current valves in conjunction with a tuned electrical LC-circuit by feeding DC current from a direct current source through a swinging inductor and current valves, applying chopped DC current with alternating polarities across the terminals of the primary winding of a transformer to which winding there is connected a parallel capacitor, whereby energy may be drained from said transformer by connecting a load to any suitable winding thereof, comprising stabilizing means for the output value by energy feedback to the DC current input side from said transformer through rectifiers said inverter apparatus comprising energy feedback means from a transformer winding (23 resp. 124, 223) back to the DC side by way of return paths through rectifiers (26, 27, 28 resp. 126, 127 resp. 226, 227, 228) said return paths comprising at least two electrically separated and magnetically coupled sections.

2. A stabilized DC-to-AC inverter apparatus capable of transforming DC current into AC current and particularly sinelike AC current, by means of trigger controlled current valves in conjunction with a tuned electrical LC-circuit by feeding DC current from a direct current source through a swinging inductor and current valves, applying chopped DC current with alternating polarities across the terminals of the primary winding of a transformer to which winding there is connected a parallel capacitor, whereby energy may be drained from said transformer by connecting a load to any suitable winding thereof, comprising stabilizing means for the output value by energy feedback to the DC current input side from said transformer through rectifiers said inverter apparatus comprising electrically separated energy feedback return paths which for magnetic coupling purposes are leading through opposite polarity terminals of inner windings (18.2, 19.2) of a differential transformer, said differential transformer being in parallel connection to at least one portion of winding (16) of the swinging inductor (15)

3. A stabilized DC-to-AC inverter apparatus capable of transforming DC current into AC current and particularly sinelike AC current, by means of trigger controlled current valves in conjunction with a tuned electrical LC-circuit by feeding DC current from a direct current source through a swinging inductor and current valves, applying chopped DC current with alternating polarities across the terminals of the primary winding of a transformer to which winding there is connected a parallel capacitor, whereby energy may be drained from said transformer by connecting a load to any suitable winding thereof, comprising stabilizing means for the output value by energy feedback to the DC current input side from said transformer through rectifiers said inverter apparatus comprising electrically separated energy feedback return paths which for magnetic coupling purposes are leading through at least two winding sections (118, 119) of the differential inductor (117), said differential inductor being in parallel connection with at least one portion of winding (116) of swinging inductor (115)

4. A stabilized DC-to-AC inverter apparatus capable of transforming DC current into AC current and particularly sinelike AC current, by means of trigger controlled current valves in conjunction with a tuned electrical LC-circuit by feeding DC current from a direct current source through a swinging inductor and current valves, applying chopped DC current with alternating polarities across the terminals of the primary winding of a transformer to which winding there is connected a parallel capacitor, whereby energy may be drained from said transformer by connecting a load to any suitable winding thereof, comprising stabilizing means for the output value by energy feedback to the DC current input side from said transformer through rectifiers said inverter apparatus comprising energy feedback means including return paths originating from a separate winding (23) of transformer (21) comprising at least two electrically separated and magnetically coupled sections 5. A stabilized DC-to-AC inverter apparatus capable of transforming DC current into AC current and particularly sinelike AC current, by means of trigger controlled current valves in conjunction with a tuned electrical LC-circuit by feeding DC current from a direct current source through a swinging inductor and current valves, applying chopped DC current with alternating polarities across the terminals of the primary winding of a transformer to which winding there is connected a parallel capacitor, whereby energy may be drained from said transformer by connecting a load to any suitable winding thereof, comprising stabilizing means for the output value by energy feedback to the DC current input side from said transformer through rectifiers said inverter apparatus comprising energy feedback means including return paths originating from the primary winding (124) of transformer (121) comprising at least two electrically separated and magnetically coupled sections.

6. A stabilized DC-to-AC inverter apparatus capable of transforming DC current into AC current and particularly sinelike AC current, by means of trigger controlled current valves in conjunction with a tuned electrical LC-circuit by feeding DC current from a direct current source through a swinging inductor and current valves, applying chopped DC current with alternating polarities across the terminals of the primary winding of a transformer to which winding there is connected a parallel capacitor, whereby energy may be drained from said transformer by connecting a load to any suitable winding thereof, comprising stabilizing means for the output value by energy feedback to the DC current input side from said transformer through rectifiers said inverter apparatus comprising energy feedback means originating from a suitable winding of transformer (221) such feedback energy being rectified and added in series to the direct current power source (230) whereby the voltage level may be regulated by means of controlled current valves.